(12) United States Patent
Lugg (10) Patent No.: US 10,954,792 B2
(45) Date of Patent: Mar. 23, 2021

(54) SUPERCONDUCTING POWER SHAFT CORE (71) Applicant: Richard H. Lugg, Yarmouth, ME (US)

(72) Inventor: Richard H. Lugg, Yarmouth, ME (US)

(73) Assignee: Sonic Blue Aerospace, Inc., Mebane, NC (US)

( * ) Notice: Subject to any disclaimer, the term of this patent is extended or adjusted under 35 U.S.C. 154(b) by 305 days.

(21) Appl. No.: 14/209,880

(22) Filed: Mar. 13, 2014

(65) Prior Publication Data

US 2016/0186570 A1   Jun. 30, 2016

Related U.S. Application Data

(60) Provisional application No. 61/800,735, filed on Mar. 15, 2013.

(51) Int. Cl.
  *F01D 5/02*  (2006.01)
  *F01D 5/34*  (2006.01)

(52) U.S. Cl.
  CPC .............. *F01D 5/02* (2013.01); *F01D 5/34* (2013.01); *F05D 2220/32* (2013.01); *F05D 2220/768* (2013.01); *F05D 2220/7642* (2013.01); *F05D 2240/60* (2013.01); *F05D 2240/61* (2013.01); *F05D 2260/404* (2013.01); *F05D 2300/10* (2013.01); *F05D 2300/507* (2013.01); *F05D 2300/605* (2013.01); *Y02T 50/60* (2013.01)

(58) Field of Classification Search
  None
  See application file for complete search history.

(56) References Cited

U.S. PATENT DOCUMENTS

| 3,705,775 | A | * | 12/1972 | Rioux ...................... | F01D 5/06 310/178 |
|---|---|---|---|---|---|
| 5,376,827 | A | * | 12/1994 | Hines ..................... | F01D 15/10 290/1 R |
| 5,607,329 | A | * | 3/1997 | Cho ........................ | B63H 1/16 310/266 |
| 6,882,068 | B2 | * | 4/2005 | Weeber .................... | H02K 9/12 310/59 |
| 7,661,271 | B1 | * | 2/2010 | Millsaps, Jr. ............. | F02C 3/00 290/52 |
| 8,424,193 | B2 | * | 4/2013 | Meinke .................. | G21K 1/093 29/602.1 |
| 9,143,023 | B1 | * | 9/2015 | Uskert ................... | H02K 16/00 |
| 2007/0126292 | A1 | * | 6/2007 | Lugg ........................ | F01D 5/03 310/11 |

* cited by examiner

*Primary Examiner* — Justin D Seabe
(74) *Attorney, Agent, or Firm* — Maine Cernota & Rardin (57) ABSTRACT

A gas turbine rotor having a combination of proximal embedded permanent magnets in the blended turbine(s) trunnion structure to which blades are integral to and through these distal trunnion channels attach to which turbine blades are integral to as a single component is provided. Permanent magnets or warm conducting coils or cold superconducting coils can be used. The structure rotates around a superconducting power shaft core (SPSC), running axially in relation to the turbine blade permanent magnets, for example, and embedded distal trunnion rings.

8 Claims, 7 Drawing Sheets

SUPERCONDUCTING POWER SHAFT CORE

CROSS-REFERENCE TO RELATED APPLICATION

This application is a nonprovisional and claims the priority benefit of U.S. provisional patent application Ser. No. 61/800,735 filed Mar. 15, 2013, of the same inventor. The content of that application is incorporated herein by reference.

FIELD OF THE INVENTION

Gas turbines, aerospace propulsion, superconducting power transmission, magnetic shaftless transmissions nanocomposite material conductors, nanomagnetic actuated plasma combustion, ramjet and scramjet combustion, magneto plasma scramjet configuration, ramjet plasma rocket propulsion architectures.

BACKGROUND OF THE INVENTION

There have been numerous investigations on analysis and scaling of electrical machines as it relates to AC synchronous permanent magnet motors and generators, but little to no analysis, or criteria, or designs for defining architectures and topology of electrical machines known as magnetic superconducting power transmissions. Actually, up tot the time of this writing of the SPSC invention and innovation, no departure from permanent magnet transmissions has been made, making SPSC unique and novel. Typically in the state of the art today, permanent magnets with known and limited magnetic fields, fluxes and Tesla strengths are utilized to effect a magnetic transmission. MAGTRAN, which preceded this invention (SPSC) was the first time a multi-stage magnetic transmission was designed as the core turbomachinery driver, segmenting the turbine, rotating electromagnetically turbine, compressor and bypass fan stages, without a mechanical shaft or spool. SPSC, provides additional advantages over MAGTRAN. The key one is that there is no power limit to the magnitude of the power density or flux created across the gap between the superconducting hollow shaft core, and the rotating turbine blisk rotor coils. The magnetic flux is an electric field, created in the form of a flux path, individualized to each rotating stage of the turbine core, where electric power is generated, passed down the superconducting hollow shaft, to the SPSC at the compressor and bypass fan stages in the electric jet turbine (previously defined in MAGJET, S-MAGHET). The electric field is generated through induction, as the field coils in the turbine blisk (Copper wound or cryogenically cooled superconducting ribbon) rotate past the inducted power field in the SPSC hollow shaft coil (to start the electrification 1.0% is needed to start the generation of the induced field). In this way there is no limit to the magnetic force generated in a superconducting architecture, which compared to copper conductors in field coils, can be raised in the 10-20 times the power level, for superconducting field coils. The analysis of magnetic force and torque density has been addressed by a number of investigators, but very little on high speed superconducting machines with reversed rotor/start architectures, either synchronous asynchronous or homopolar, AC or DC, has been investigated or developed. In the application and invention of a superconducting power core in turbomachinery, it has never been invented, the "superconducting power shaft core" is a first.

Aero gas turbine engines are very high speed thermodynamic machines generating thrust or shaft horsepower for aerospace applications, burning jet fuel for combustion with the high speed exhaust effluent (2500 to 3000 ft./sec). The exhaust effluent impinges on turbine blades and rotating them, torque transferred through gaseous, conductive, convective and radiative forces as kinetic energy, where the turbine blades may be attached to a blisk, and rotated at high speed (10,000-15,00 rpm) which is in turn attached to a mechanical drive transmissions at the center of the engine, defined as a spool or shaft, where several shafts or spools run one inside the other connective the entire machine between turbine system components, i.e. bypass fan, compressor and turbine. No design, nor innovation has been conducted on utilizing innovative architectural approaches to consider the creation of a "clean sheet" design of gas turbines in 85 years since their invention, to the electrification of the turbine (thus removing the shaft) and the art of a superconducting power shaft core (SPSC), an entirely new revolutionary approach functioning as a center conduit with integrated cryogenics, replacing the drive shaft in a turbine, which acts as the induction or start side of a magnetic machine to generate power, and hence not only electrically segment the turbine but also provide multi-megawatts of additional electric power to the machine, and ancillary uses on board an aircraft, ground vehicle or otherwise. The SPSC acts as a guiding channel for the rotating turbine compressor or bypass elements which are utilized to provide operation of the turbine as a thermal machine. The SPSC utilizes magnetic levitation tracks which suspend each independently rotating turbine stage (bypass fan or compressor stage) where by the radial superconducting tacked ribbon architecture running as a multi-layer three phase helical wound 3-phase conductor (or in the second embodiment of the invention as longitudinally down the shaft has intermittent non-magnetic materials interspersed radially between the ribbon tracks) and thus above these in a channel lie active interspersed radially between the ribbon tracks) and thus above these in a channel lie active magnetic bearing blocks which create repulsive magnetic field forces against opposing active magnetic bearings in the trunnions of the said turbine stages, or compressor stages/by pass fan stages, to which compressor, or turbine vanes are attached. Here the electromagnetic architecture of SPSRC involves both a superconducting pathway down the entire length of SPSC within the interior of the exoskeleton of the engine, but that it also serves as a magnetic track pathway to suspend each counter rotating stage it is powering of the turbomachinery using electromagnetics powerful enough to separate stages and remove a mechanical shaft or spool, and in its place use a non-mechanical but high power superconducting electrical core, provides the innovation to move gas turbines to a whole new revolutionary machine architecture where a multitude of magnetic gearing, or gear ratios to extract 100% efficiency from a rotating gas turbine (electrical or otherwise) may be realized. This is in particular an aero gas turbine engine machine, which has a broad need for improvement of both thermodynamic, and aerodynamic efficiencies, which has ever been done before.

Past research has focused mainly on the calculation of the torque as the output of a rotating body in electrical machines, but nothing as with a stator and a rotor in a turbine machine or gas turbine engine for aero-propulsion. Nor with high speed AC superconductors in order to have very high power densities to be able to remove the old way of mechanical transmissions or spools in gas turbines and segmenting stator/rotor stages independently from one another thus optimizing flight and operational conditions of the engine, and maximizing efficiencies. In the past researchers have drawn comparisons on several different methods to calculate the torque density and transmission of power. These efforts resulted in torque density calculation at several different locations along the baseline of an experimental three-phase stator and rotor permanent magnet synchronous electrical machine demonstrating a quasi-static magnetic field for example.

No application has ever been done in defining innovative topologies for a superconducting AC, electromagnetic, segmented, high torque density, high speed (above 10,000 RPM) electric gas turbine engine transmission, whereby the central conductor is at the core of the engine (and may be hollow for structural and weigh saving considerations), and that in acting as a central stator (non-rotating) it may carry continuous electrical power from the back at the turbine core to the front at the compressor and bypass fan. Variation of the magnetic density ratio is acquired by the circumferential power capacitance switch ring at each turbine stage (this adjusts the sine wave, wave form of the North and South rotating poles), the power being induced to the SPSC core by the rotating, segmented turbine stages (in the case of HYPERDRIVE the SPSC may act as a structure for an integrated third engine cycle in the form of a hybrid scramjet with a superconducting compression tunnel) occurring from the rotating turbine stages with superconducting electromagnetic field coils in the trunnions inducing the electrically generating field. In high power density electrical permanent magnet machines, particularly with innovative architectures to increase torque density through volume and surface area, these magnetic phenomena have to be addressed more so when there is the requirement of a multitude of generated magnetic fields and individual torque densities as in SPSC that must be maintained and controlled stage to stage in line down the length of the MAGJET, S-MAGJET or H-MAGJET engine.

The generating and arrangement of these multiple magnetic fields must be addressed more so during high speed operations due to potential high frequency resonance "interfields" so as not to interfere with a continuous power requirement of high torque densities and high Tesla fields delivering high torque density, large magnetic fields, thus transmitting power in high speed operations as in magnetically segmented aero gas turbine engines, MAGJET, S-MAGJET, H-MAGJET and HYPERDRIVE.

SUMMARY OF THE INVENTION

A gas turbine rotor having a combination there of proximal embedded permanent magnets in the blended turbine trunnion structure to which blades are integral to and through these distal trunnion channels attach, to which turbine blades are integral to as a single component, thereof exist permanent magnet. A rotor comprised of warm conducting coils, or cold superconducting coils) levitating fields, rotating around a superconducting power shaft core (SPSC), running axially in relation to said turbine blade magnet and embedded distal trunnion rings. Trunion rings are formed of a flat plate blisk to which said turbine blades are integral to a single metal crystalline structure metal casting where one end the trunnion structure exists, and with the other, tapering down from the individual turbine blades into a common structure. The rotor is further comprised of circular near net shaped power generation permanent magnetic bearings and permanent magnet electromagnets rotating around a common superconducting hollowcore shaft, which holds placement channels for the turbine blisk trunnion of one or more of power turbine or compressor rotors.

DETAILED DESCRIPTION OF THE INVENTION

Figure 1:
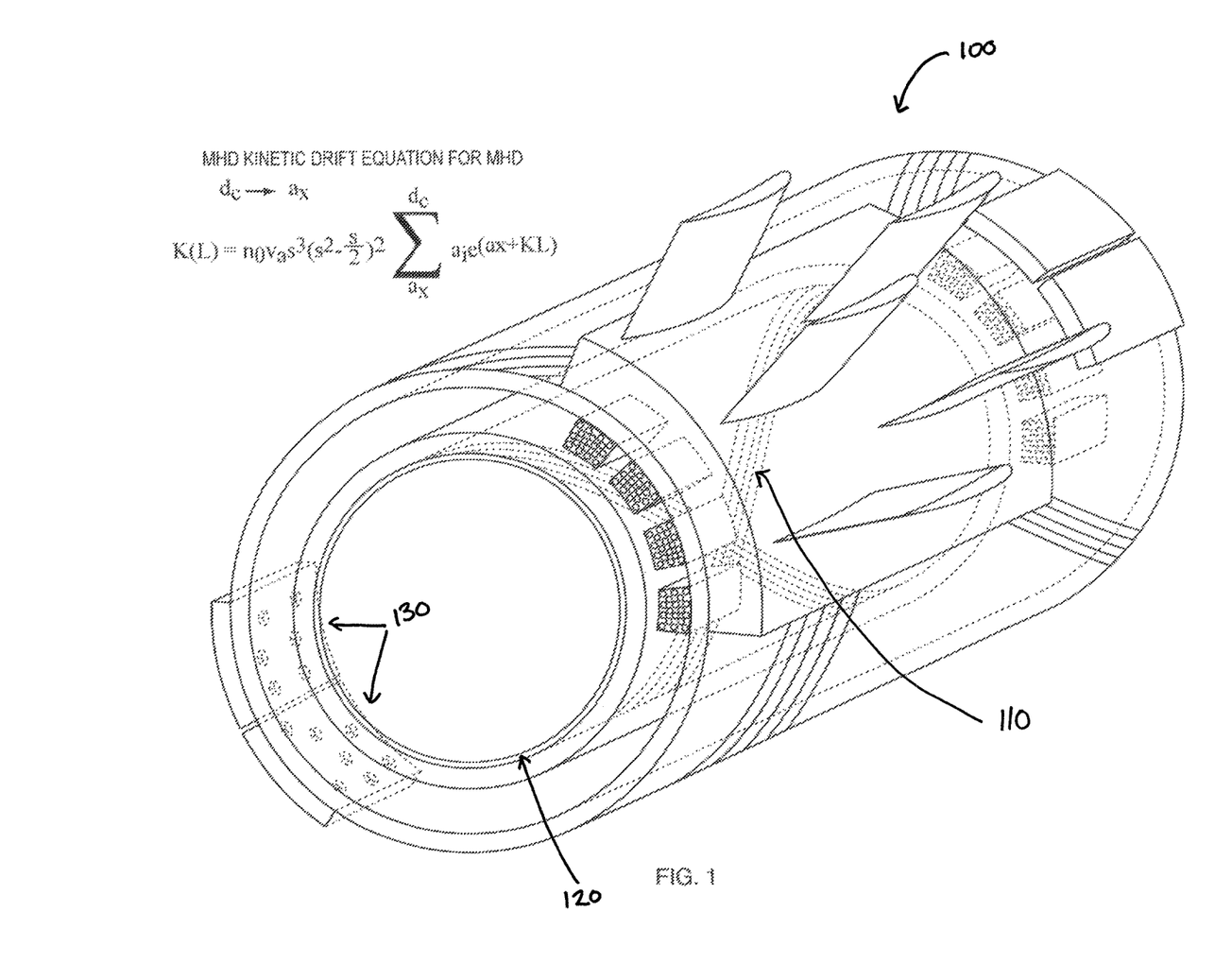
FIG. 1 is a front perspective view of the gas turbine rotor, including double helical superconducting coils, a superconducting power shaft core, and power generating action plate.
Figure 2:
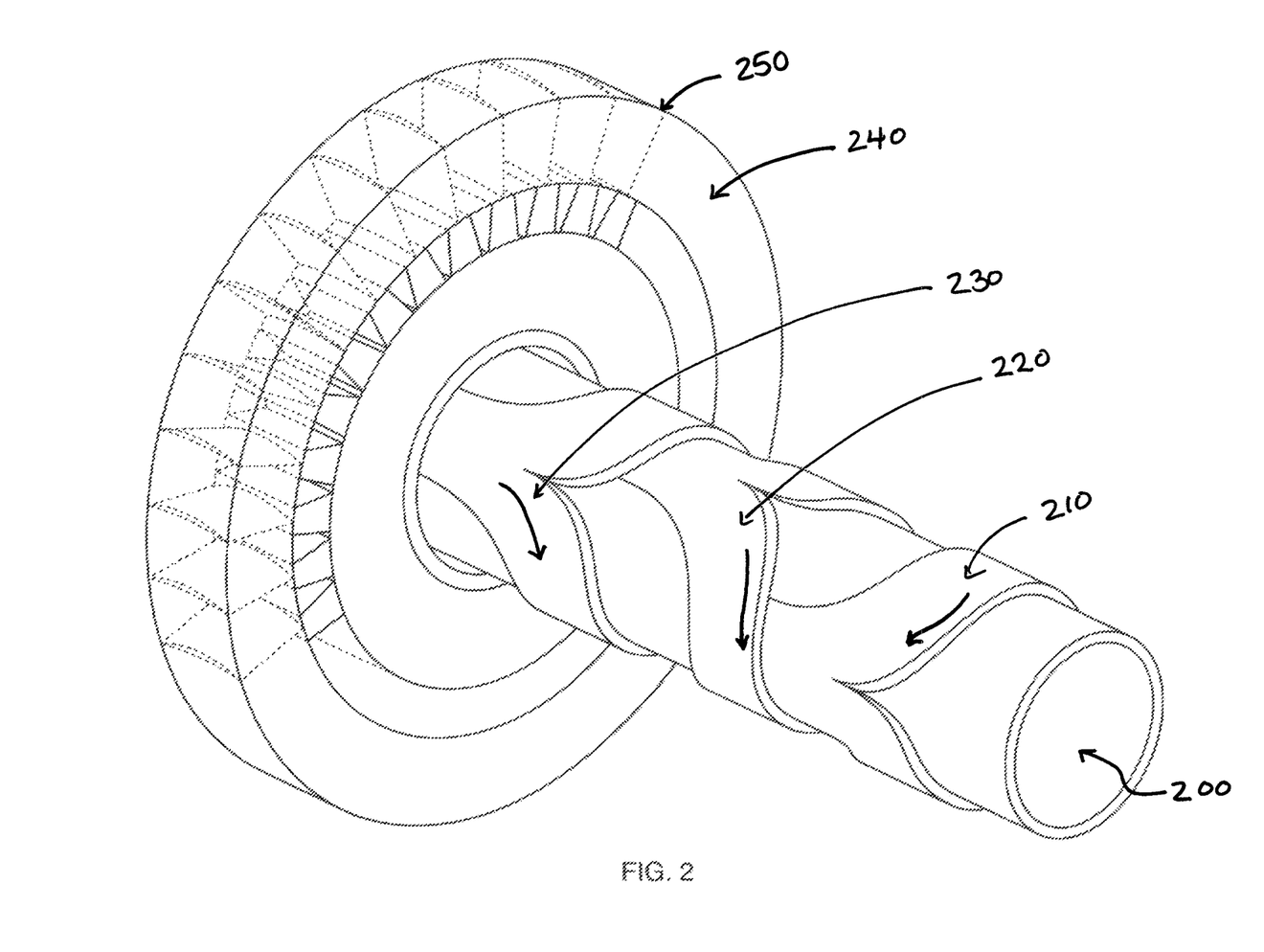
FIG. 2 is a perspective view of superconducting power shaft core of FIG. 1 with three-phase superconducting ribbon winding, and an exemplary flat plate blisk illustrated.
Figure 3:
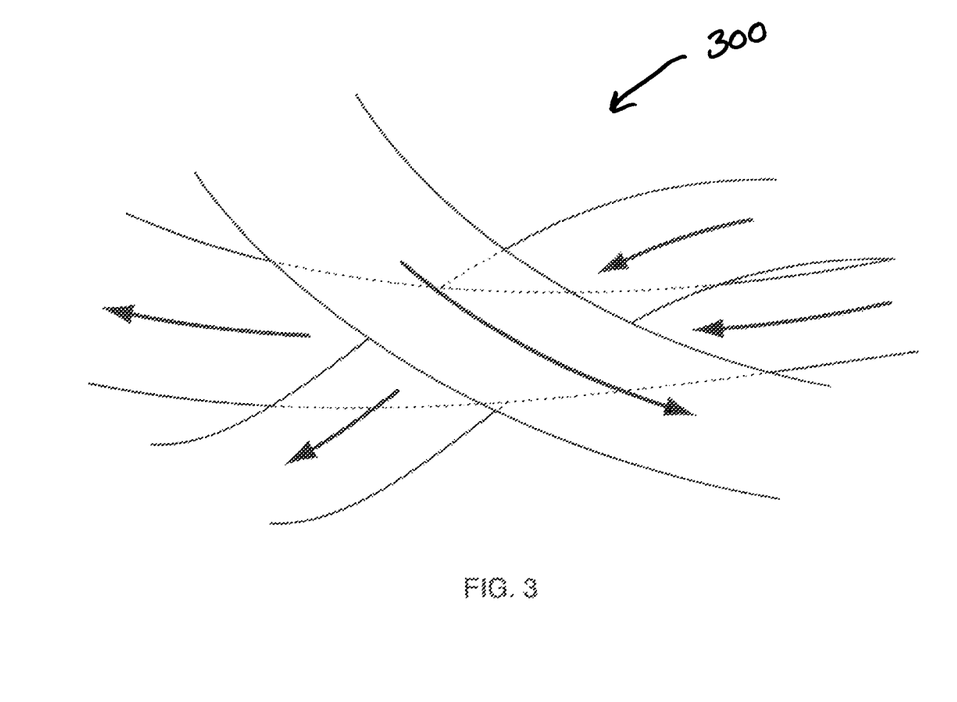
FIG. 3 illustrates the arrangement of the helical wound superconducting three-phase pole of FIG. 2
Figure 4:
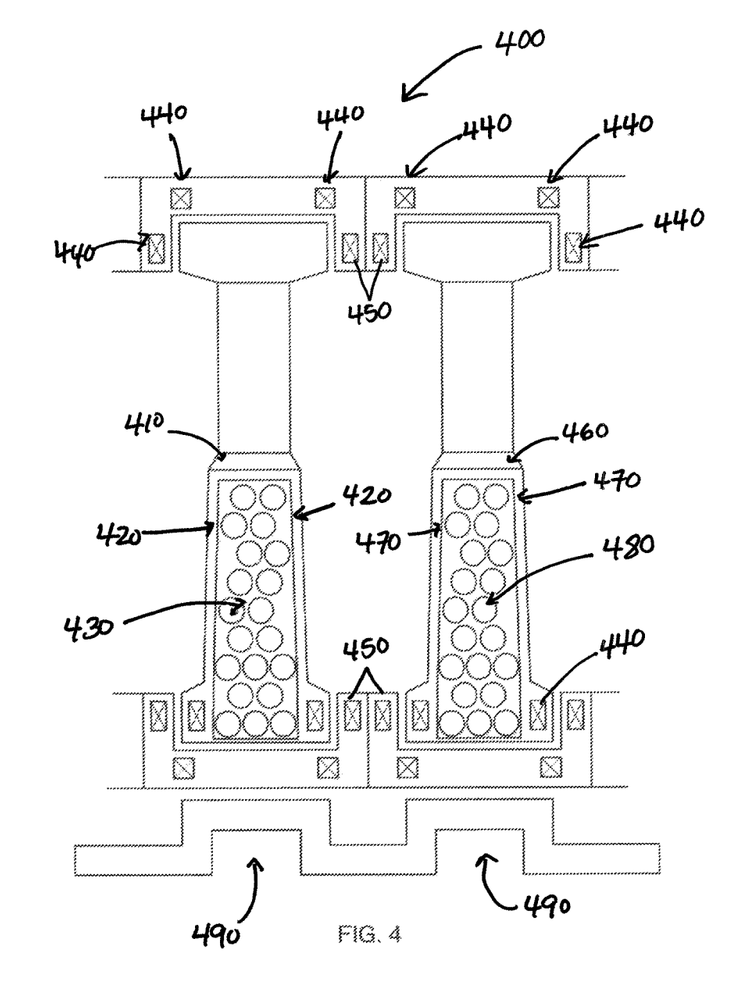
FIG. 4 is a partial cutaway view of the interior of superconducting power shaft core of FIG. 2 illustrating single-stage superconducting shaft-less architecture.
Figure 5:
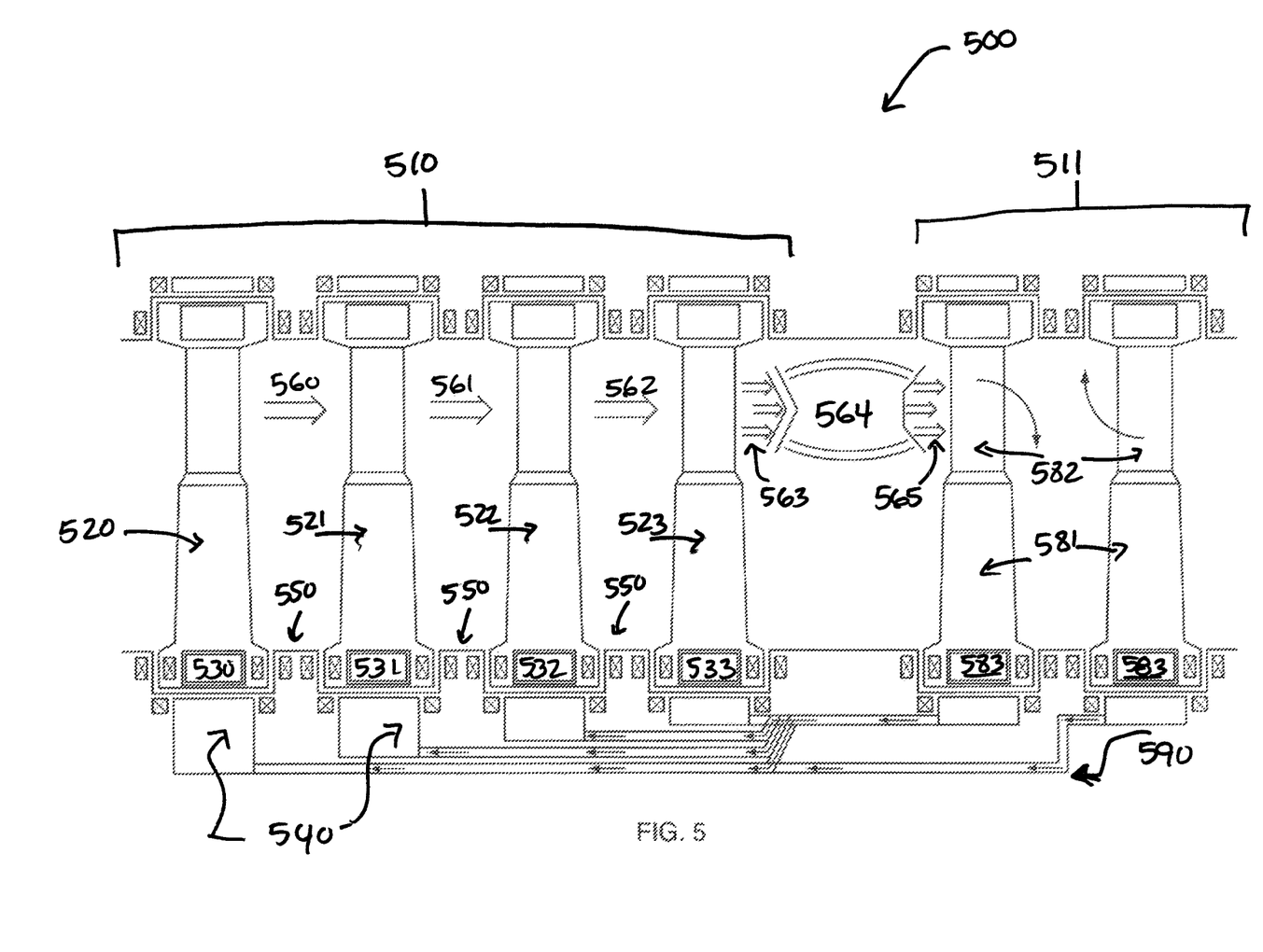
FIG. 5 is a cutaway view of the interior of the superconducting power shaft core of FIG. 2 illustrating multi-stage superconducting shaft-less architecture.
Figure 6:
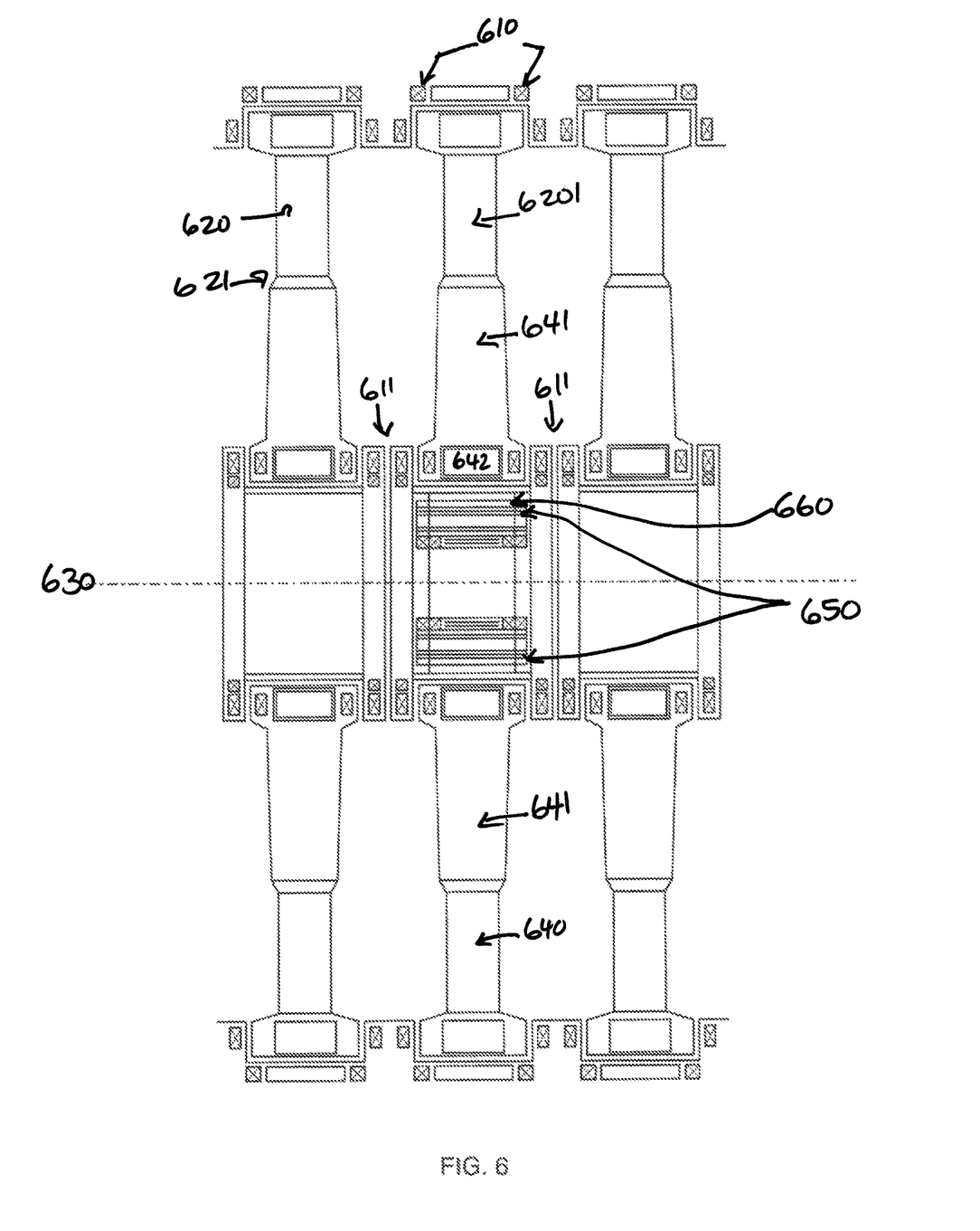
FIG. 6 is a cutaway view of the interior of the superconducting power shaft of FIG. 1 turbine illustrating fully superconducting turbine core configuration.
Figure 7:
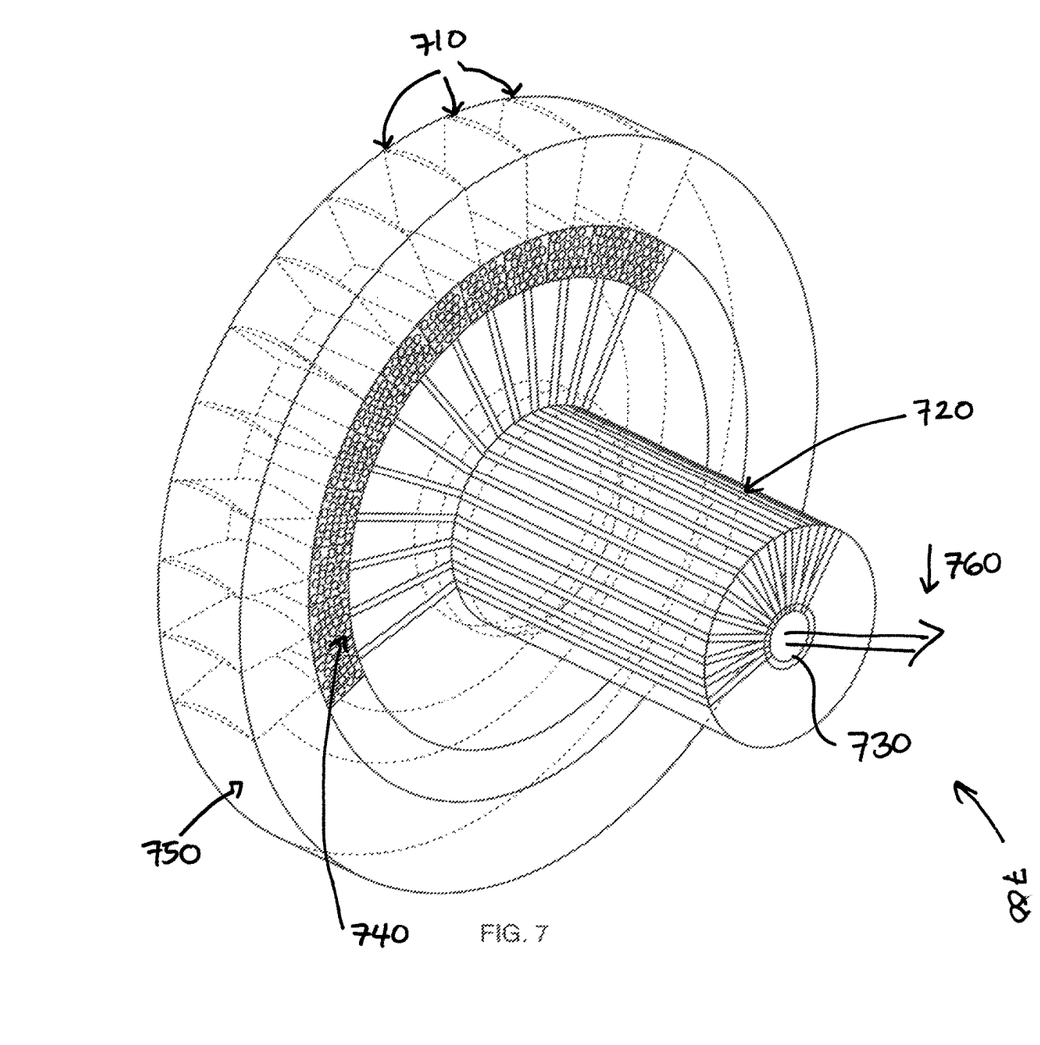
FIG. 7 is a perspective view of the present invention illustrating the radial conductor configuration from the superconducting power shaft core to the turbine vanes of FIG. 2 within the turbine blisk.

FIG. 1 shows a gas turbine rotor 100 embodiment, including double helical superconducting coils 110, a superconducting power shaft core 120, and power generating action plate 130. FIG. 2 shows the superconducting power shaft core embodiment 120 of FIG. 1 or hollow shaft core 200 associate with three-phase superconducting ribbon winding 210. 220. 230, and a flat plate blisk or turbine blisk face 240 associated with a turbine 250. FIG. 3 shows an arrangement 300 of the helical wound superconducting three-phase pole of FIG. 2. FIG. 4 shows a cutaway view of the interior of a superconducting power shaft core 400, illustrating single-stage superconducting shaftless architecture. FIG. 4 shows an arrangement including a turbine blade 410, 460, associated with a turbine blisk 420, 470, associated with copper inductive coils 430, 480. Levitation magnets are shown dispersed at the ends of the configuration 400, e.g., at 440. Permanent magnets for levitation are shown at 450. Superconductors are shown at 490, in an example embodiment. FIG. 5 shows a cutaway view of the interior 500 of the superconducting power shaft as shown, e.g., in FIG. 1 turbine, illustrating a fully superconducting turbine core configuration. FIG. 5 shows compressor stages 510 and first turbine stage 511. Compressor blisks 520, 521, 522, 523 are associated with a copper or super conductor 530, 531, 532, 533. An air flow occurs at 560, 561, 562, 563, to a combustor 564 which then pushes the air flow 565 to the first turbine stage 511. In the first turbine stage 511, the air flow 565 pushes through the turbine blades 582. The turbine blades 582 are associates with a turbine blisk 518 and superconductor 583. There is a power delivery 590 from the SPSC generator to the SPSC core motor drive 540. FIG. 6 shows a cutaway view of the interior of the superconducting power shaft, e.g., of FIG. 1 turbine, illustrating fully superconducting turbine core configuration. Here, fully superconductive refers to both rotor (moving) and stator (stationary). In FIG. 6, levitation magnets 610 are shown throughout the cutaway. FIG. 6 also shows a turbine blade 620, associated with the distal end of a turbine blisk 621. FIG. 6 shows a turbine blade 6201 associated with a turbine trunnion 641, associated with a superconductor 642, close in space to permanent magnets 611 an insulating layer 660, cold radiation shield 650, turbine trunnion 641, and turbine blade 640. FIG. 6 shows the axis of the SPSC turbine at 630 for perspective. FIG. 7 shows a radial conductor configuration 700 from the superconducting power shaft hollow shaft core 730 to the turbine vanes 710 of, e.g., FIG. 2 within the turbine blisk. FIG. 7 shows super conducting power cables from the turbine blisk 720, superconducting coils on the blisk 740, and what is termed the fece 750, and plasma flow direction 760.

A gas turbine rotor(s) having a combination there of proximal embedded permanent magnets in the blended turbine(s) trunnion structure to which blades are integral to and through these distal trunnion channels attach to which turbine blades are integral to as a single component, thereof exists permanent magnet) or in another embodiment warm conducting coils, or cold superconducting coils) levitating fields, rotating around a superconducting power shaft core (SPSC), running axially in relation to said turbine blade magnets and embedded distal trunnion rings. These consist of a flat plate blisk to which said turbine blades are integral to a single metal crystalline structure metal casting where one end the trunnion structure exists, and with the other, tapering down from the individual turbine blades into a common structure which feeds at supersonic to hypersonic speeds (Mach 2.0 to Mach 5.0) inlet air into a common, but two stage dual-use combustor, and where further inboard there are circular near net shaped power generating permanent magnetic bearings and permanent magnet electromagnets rotating around a common superconducting hollowcore shaft, which holds placement channels for the turbine blisk trunnion(s) of one or more of power turbine or compressor rotors (in case of the HYPERDRIVE patent, 13 compressor stages, and 4 power turbine stages) each being associates with a blisk. In the distal end of each blisk(s) embedded therein, there includes a moveable turbine rotor having a first magnetic field associated therewith, a stator configured with a plurality of stationary stator superconducting windings in a double helical wound configuration therein, which feed into the superconducting permanent ribbon conductor (ideally copper) which make up the superconductor hollowcore shaft running down the middle of the turbine rotor. It each has its own helical winding of power density superconducting ribbon architecture arrangements, based on power density requirements for said turbine stage. As an example, the superconducting power shaft core may have three bi-axial, helical wound arrangements resembling a 3-phase pole arrangement in the generator architecture in a turbine core power generation structure. This exemplifies the requirement for each electric segmented power stage of the turbine (whether bypass fan, compressor or turbine). Magnetic fields generate power, wherein the first magnetic field flux provides, as so configured, magnetic levitation bearings for the rotor, and the second, but larger magnetic field, provides very high electric power generating capabilities at multi-megawatt levels, and a magnetic flux modulator interposed between the moveable permanent magnet embedded rotor and the superconducting stator windings, controlling the magnitude of the flux density, Tesla, created between the rotor blisk with the power generation permanent magnets (or cold or warm coils), and the superconducting power shaft core (SPC). A magnetic flux of very high strength (between Tesla 5.5-8.0, typically in the known art Tesla field are only seen between 1.0 and 2.0) is generated between the poles of the rotating blisks, containing the permanent magnets and the superconducting hollow power architecture shaft core, contained as radial and axial lengths, running down the shaft, wound as superconducting ribbon conducting channels. Here the superconducting channels, which include superconducting laminated tape or ribbon may have the topology of a double helix spiral wound architecture (a liner radial superconducting ribbon architecture is observes as a second embodiment of the SPSC invention). The spiral would topology is the preferred embodiment as it offers continuous controlled magnetic flux down the length of the power shaft core, and can be lawyered into the ideal 3-Phase power electric machine architecture upon the hollow-core shaft. This architecture is best suited for high speed, synchronous AC electric field design which SPSC exemplifies. The linear topology offers less continuous magnetic field flux, but offers a higher power density and is better suited as for an induction machine function as in SPSC, verses in the double helix wound topology it offers a higher frequency of operation, and a more continuous flux pattern across the shear gaps between the distal end of the rotor trunnion blisks and SPSC. The turbine vanes at the distal end of the blisks and the trunnion holding the permanent magnets are magnetically levitated between an array of permanent magnets with a synchronous AC superconducting field generated between the permanent magnets and the superconducting hollow shaft. In a second embodiment, the permanent magnets are instead superconducting cryogenically cooled coils on the rotor (turbine blisk rotating stage driven by the superconducting stationary, stator, shaft core), cooled using a slip ring on the multi-segmented superconducting hollow shaft for each stage. The superconducting hollow shaft is not rotating. Its sole objective is to deliver multi-megawatt levels of power through the core of the turbine from back to front as a cylindrical wound superconducting composite electrical corridor, with segmented but interstage, interconnected, helical wound superconducting field coils, each independently are fed by a cryogenic stream of hydrogen cooled to 70 K through a series of cryogen induced feed channels adjacent, and at axial length, to each turbomachinery stage. Multi-megawatt electric power is generated at the back end of the SPSC from the rotating turbine superconducting blisks, and passed forward to the segmented superconducting electric compressor and bypass fan which receives power from the SPSC, it acting as a large superconducting, non-rotating electrical corridor down the center of the engine. The feeding and propelling the rotating blisk turbine electrical machinery, in counter rotating fashion is allowed for the highest aerodynamic efficiency (dependent on the trunnion magnets and the excitation field induced) one to another (this provides the highest power electric superconducting turbomachinery architecture and offers the complete segmentation of the MAGJECT engine or HYPERDRIVE engine.

The superconducting Power Shaft Turbine Core ("SPSC") is a unique and innovative approach to electrifying and creating a complete multi-segmented turbomachine, to produce or increase a shaftless but electric drive architecture of very high power density (above 5.0 Tesla) fuel efficiency, mechanical structural loads, reduce parts count, reduce aerodynamic drag to zero, improve thrust to weigh ratio, produce multi-megawatts of additional electric power, an architecture which can use ceramic composites in rotating blade machinery, and create and exoskeleton compressive load machinery, remove the need of lubricants, remove the need for liquid pumps, and reduce engine weight. As an example, SPSC in the HYPERDRIVE engine architecture design has four to five SPSC turbine stages, which rotate about axially to the superconducting power shaft core (SPSC), and delivers up to 35 megawatts of electric power forward to electrically operate the segmented compressor and bypass fan, offering total interstage independence, which has shown to increase inefficiency of up to 400%. Rotational speeds of the forward compressor and low volume bypass fan of the MAGTRAN architecture are governed by the amount of electrical power delivered from the induction power generation occurring between the proximal blisk and channel ends of each turbine stages in the HYPERDRIVE architecture to which SPSC turbomachinery are a part of, where the electrical power is transmitted across a generated magnetic flux gap, or field, from the rotating turbomachinery, in close proximity with each of its magnetically levitated guided channels, and the non-rotating super conducting power shaft core (stator), which is stationary, and acts as a superconducting pathway or corridor through the center of the MAGJET, S-MAGJET, OR H-MAGJET or HYPERDRIVE engine. With a superconducting core, or corridor, acting as both a conductor and as a structural guidance component intimate to the rotating embedded magnet blisks, this presents something for the first time, that is novel and unique in jet engine turbomachinery propulsion. Additionally, the superconducting power shaft core (SPSC) may be very large in diameter so as to address the upper limits of specific impulse power by essentially acting as either a cooling pathway for bypass air, or conversely, as a linear toroidal superconducting propulsor accelerator to accelerate the HYPERDRIVE engine architecture, as described in the provisional patent HYPERDRIVE, by utilizing bypass exhaust effluent combustion product from the combustor, with partial contribution going out through the center of the engine, bypassing at a specific percentage basis the SPSC turbine stages.

An electromagnetic circumferential switch acting as a capacitance solenoid has the effect of a modulator for speed control of each SPSC stage, where essentially its acts as an electrical circuit switch, or rheostat device (to control the magnitude of the flux), so defined in its position so that 1.0% of the electrical energy pulled off of the SPSC stages, to interrupt the flux path, and the magnitude of Tesla, whereby the ratio of speed of each SPSC stage can be independent of the other. Interruption of the magnitude of the flux path may break the magnetic torque field between the stator and the rotor via interruption of the in phase and out of phase sinusoidal field that supports the magnitude and intensity of the magnetic flux of SPSC, effectively creating a variable magnetic torque drive between the SPSC and each stage of the turbomachinery stages. SPSC may also be configured as a propulsion engine architecture such that the turbine stages that generate power as SPSC may be associated as tip driven turbines and can be driven by rather than combustion gases from hydrocarbon fuels combusted with oxygen and air under pressure and ignition are discharge, but rather in a second embodiment the turbine tips may be driven by cryogenic fuels such as oxygen and hydrogen mixed under pressure in a turbo pump and spun up to high speed in this manner as an alternative, and at the proximal end of the turbine blades at the trunnion above the SPSC where the embedded magnets are located in the root of the blades, and power generation is created by the induction of an electric fields between the rotating trunnion and turbine rotor of each stage against the fixed SPSC shaft. In this case, the engine is in the form with the HYPERDRIVE future engine architecture, as a vehicle utilizing more of a non-air breathing design, with cryogenic hydrogen mixed with cryogenic oxygen, methane, ethylene, or pentane, to form combustion product that under very high pressure once mixed presents rapidly expanding combustion gases that drive the turbine tips in the rotors, with the proximal end containing the magnetics in the trunnion, and electrical power generated across to the stator in the form of SPRC generating power at the turbine core.

Transmitted torque between the first magnetic fields associated with said moveable first proximal rotor trunnion inboard of the first SPSC stage, and a second magnetic field running as a Normal vector to the first field in the same first SPSC stage, is managed as magnetic torque and power through a plurality of magnetic flux paths, which become arranged axially in the intermediate intermodulator power ring switch (IPRS), a circular diode capacitance resistor ring, so positioned that it can interrupt the magnetic flux path at 1.0% gain above the magnetic resonance field and operative frequency set between the rotor and stator at the proximal inboard end of the turbine bade(s) of SPSC. In this case, the field is excited by the plurality of stationary stator electromagnetic helical superconducting magnetic coils in the proximal trunnion of said turbine blades to which they are attached such that they are governed by the position of the IPRS switching ring, in reference to the rotating (at different speeds, hence flux paths) rotor, and its magnetic field poles respectively, and the speed of the rotor, and its interfering with the referenced field pole and flux gate path arrays, which open or close to the necessary sequencing for the desired speed of the flight operating condition of any given SPSC stage, driven either by the combustion gases of straight hydrocarbon fuels or through oxygen/hydrogen tip driven fuel combustion at the turbine tips.

What is claimed is:

1. A gas turbine rotor comprising:
   a combination thereof proximal embedded magnets in a turbine trunnion structure to which turbine blades are integral to and through distal ends of trunnion channels attach, to which the turbine blades are integral; and
   levitating fields and power generation fields resulting from said magnets, rotating around an inner structure of a hollowcore superconducting power shaft core (SPSC), running axially in relation to the proximal embedded permanent magnet in the turbine trunnion structure over the hollowcore superconducting power shaft core, wherein the embedded distal trunnion rings are formed of a flat plate turbine blisk to which the turbine blades are integral to a single metal crystalline structure metal casting where a first end of the turbine trunnion structure is situated;
   wherein at least some of the magnets rotate around the hollowcore shaft of the superconducting power shaft core, which holds trunnion channels for the turbine blisk trunnion of at least one of power turbine and compressor rotors, and other of said magnets are stationary inside the hollowcore shaft.

2. The gas turbine rotor of claim 1 wherein at least one of the embedded magnets is a permanent magnet.

3. The gas turbine rotor of claim 1 wherein there is at least one warm conducting coil and cold superconducting coil.

4. A gas turbine rotor comprising:
   a combination thereof proximal embedded permanent magnets in a turbine trunnion structure to which turbine blades are integral to and through distal ends of trunnion channels attach, to which the turbine blades are integral; and
   at least one of warm conducting coils and cold superconducting coils levitating fields and power generation fields, rotating around an inner structure of a hollow-core superconducting power shaft core (SPSC), running axially in relation to the proximal embedded permanent magnet in both the turbine trunnion structure and embedded distal trunnion rings, wherein embedded distal trunnion rings are formed of a flat plate turbine blisk to which the turbine blades are integral to a single metal crystalline structure metal casting where a first end of the turbine trunnion structure is situated.

5. The rotor of claim 4 further comprising: a circular net shaped arrangement of at least some of the magnets which rotate around the hollowcore shaft of the superconducting power shaft core, which holds trunnion channels for the turbine blisk trunnion of at least one of power turbine and compressor rotors.

6. The rotor of claim 4 wherein the embedded permanent magnet is a magnetic coil portion.

7. The rotor of claim 4 wherein the embedded permanent magnet is a magnetic coil portion.

8. The rotor of claim 4 further comprising a circular net shaped power generation permanent magnetic bearings and permanent electromagnets which rotate around the hollow-core shaft of the superconducting power shaft core, which holds trunnion channels for the turbine blisk trunnion of at least the power turbine and compressor rotors.

* * * * *